No. 685,097. Patented Oct. 22, 1901.
W. C. BUSH.
HARVESTER KNIFE AND FASTENING THEREFOR.
(Application filed Jan. 8, 1901.)
(No Model.)
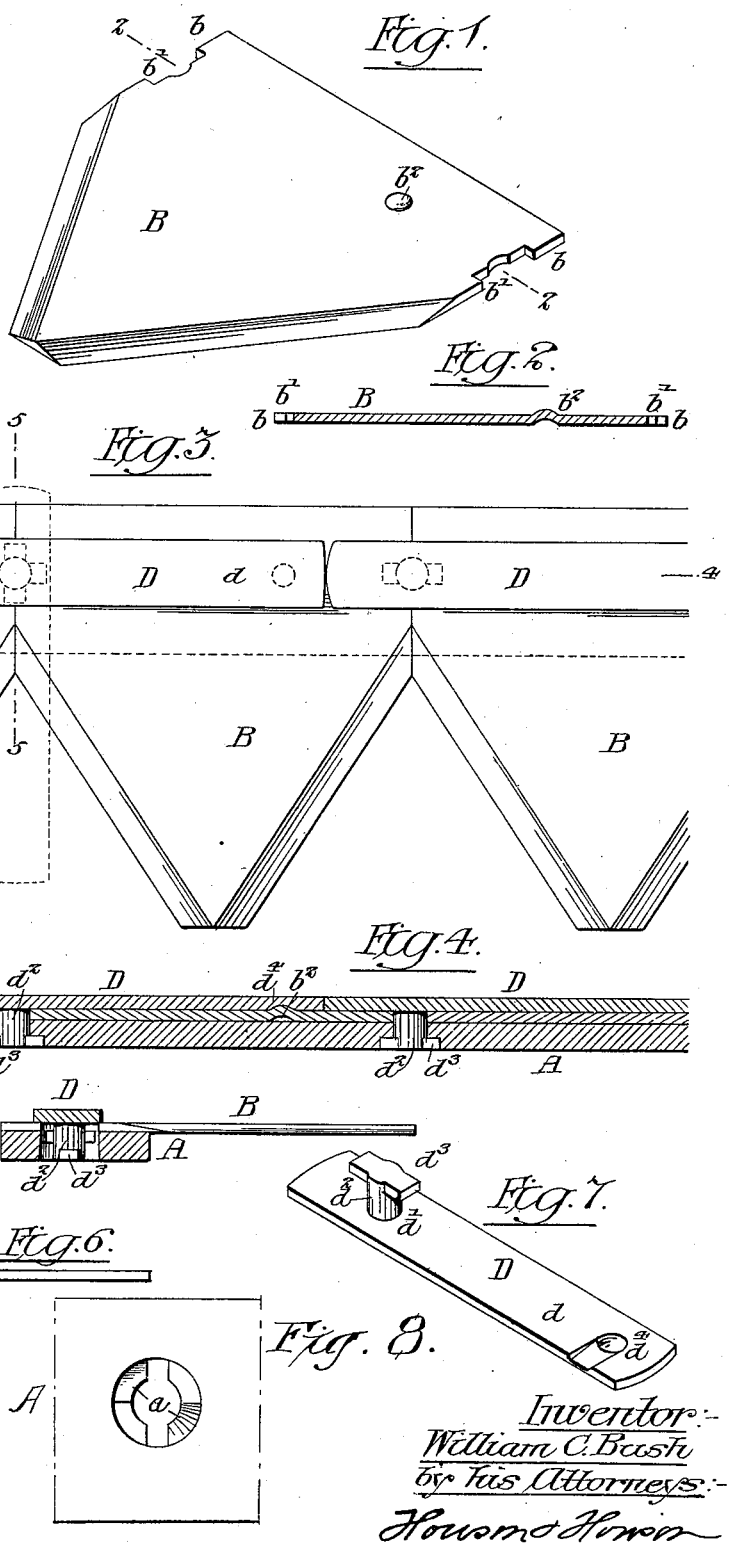
Witnesses:-
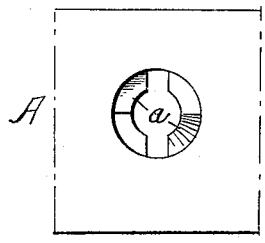
Inventor:-
William C. Bush
by his Attorneys:-
Howson & Howson

UNITED STATES PATENT OFFICE.

WILLIAM C. BUSH, OF WILMINGTON, DELAWARE.

HARVESTER-KNIFE AND FASTENING THEREFOR.

SPECIFICATION forming part of Letters Patent No. 685,097, dated October 22, 1901.

Application filed January 8, 1901. Serial No. 42,529. (No model.)

*To all whom it may concern:*

Be it known that I, WILLIAM C. BUSH, a citizen of the United States, and a resident of Wilmington, Delaware, have invented certain Improvements in Harvester-Knives and Fastenings Therefor, of which the following is a specification.

My invention relates to certain improvements in harvesting-machine knives and fastening devices for the blades thereof, for which Letters Patent were granted to me on the 25th day of July, 1899, numbered 629,656.

The object of my present invention is to perfect the form of the blade and to apply the fastenings to the edges of the blade instead of at the center, as in the above-mentioned patent.

In the accompanying drawings, Figure 1 is a perspective view of my improved harvester-blade. Fig. 2 is a section on the line 2 2, Fig. 1. Fig. 3 is a plan view showing a series of blades secured to the cutter-bar of a harvesting-machine. Fig. 4 is a section on the line 4 4, Fig. 3. Fig. 5 is a section on the line 5 5, Fig. 3. Fig. 6 is an edge view of the fastening device. Fig. 7 is an inverted perspective view of the same; and Fig. 8 is an inverted perspective view of a portion of the under side of the cutter-bar, showing the form of the recess-locking device.

A is the cutter-bar, to which the blades are secured.

B represents the blades shaped in the ordinary manner and having cutting edges, as shown. Each edge $b\ b$ of the blade B is notched at $b'$ for the passage of the locking device described hereinafter. In the present instance the notch is shown to fit the locking device shown in Fig. 7; but other forms of locks may be used without departing from my invention.

D is the locking device in the form of a lever, having a long arm $d$ and a short arm $d'$. $d^2$ is a shank having a cross-bar $d^3$ at its lower end, as shown clearly in Figs. 6 and 7.

When the knife-blades B are placed in position, as shown in Fig. 3, the locking device D is applied to the blades and cutter-bar in the position shown by dotted lines, allowing the cross-bar $d^3$ to pass through the opening formed by the adjoining notched portions of the blades and through the slot in the cutter-bar A. The cutter-bar is undercut to allow the cross-bar to turn freely, so that the fastening device can be turned to the position shown in full lines in Fig. 3, thus confining the knife-blades to the cutter-bar.

I preferably form the undercut portion of the cutter-bar, as shown at $a$ in Fig. 8, with a cam-like bearing-surface, so that the cross-bar or head of the shank will draw the knife-blade tightly to the cutter-bar, making a neat and rigid fastening.

In order to hold the securing device in the position shown in Fig. 3, I strike up a projection $b^2$ from the body of the blade, as illustrated in Figs. 1 and 2, and recess the under side of the arm $d$ of the fastening device at $d^4$, as shown in Fig. 7, and a throat decreasing in depth as it approaches the recess is formed in the arm leading to the recess, so that the securing device can be readily turned from the position shown by dotted lines in Fig. 3 to that shown by full lines and forced to the knife and held rigidly by the projection, so that when the several securing devices are in position they form a continuous lock from one end of the bar to the other. This is done without perforating or weakening the blades in any manner, and the lock is simple and can be readily applied.

I claim as my invention—

1. The combination of a cutter-bar, a series of blades notched at each edge, a series of locking-levers, each of the levers having a headed shank, the notches in the adjacent edges of the blades being so shaped as to form an elongated slot in the abutting edges of adjacent blades, and the heads of the shanks on the locking-levers being of such corresponding shape as to permit their insertion and withdrawal from the elongated slot only when they have been turned a predetermined distance from their locking position, said levers overlapping the adjacent edges of the blades when in their locking position, substantially as described.

2. The combination of a cutter-bar, a series of blades notched at each edge, the said notches being so shaped as to form elongated slots in the abutting edges of adjacent blades and a series of locking-levers extending over the blades and having a headed shank passing through said slots with the heads of said shanks overlapping the edges of the abutting blades and locking the same in place in the cutter-bar, each lever being provided with a recess and each blade having a projection corresponding to said recess adapted to engage the recess to lock the lever and blade together when the former is turned to a position to lock the blades, substantially as described.

3. A fastening device for harvester-blades having two arms, a shank $d^2$, and a cross-bar $d^3$, one of the arms of said fastening device recessed and having a throat extending to the recess, substantially as described.

In testimony whereof I have signed my name to this specification in the presence of two subscribing witnesses.

WILLIAM C. BUSH.

Witnesses:
 MARY CULBRETH,
 THOMAS J. BOWEN, Jr.